United States Patent [19]
Nakashima et al.

[11] Patent Number: 5,631,632
[45] Date of Patent: May 20, 1997

[54] PRESSURE MONITORING SYSTEM

[75] Inventors: Hiroshi Nakashima, Nishio; Toshiaki Hamada, Okazaki; Tadashi Terazawa, Toyota; Yuichiro Sakakibara, Hekinan, all of Japan

[73] Assignee: Aisin Seiki Kabushiki Kaisha, Kariya, Japan

[21] Appl. No.: 697,602

[22] Filed: Aug. 27, 1996

[30] Foreign Application Priority Data

Aug. 31, 1995 [JP] Japan .................. 7-223454

[51] Int. Cl.⁶ ................................. G08B 21/00
[52] U.S. Cl. .................. 340/611; 340/626; 116/168; 138/30; 73/40; 73/121
[58] Field of Search ............... 340/611, 605, 340/626; 116/168; 138/30, 31; 73/39, 40, 168, 121, 129; 303/92

[56] References Cited

U.S. PATENT DOCUMENTS

| | | | |
|---|---|---|---|
| 4,800,367 | 1/1989 | Klintenstedt et al. | 340/626 |
| 4,801,247 | 1/1989 | Hashimoto et al. | 417/213 |
| 5,004,264 | 4/1991 | Kozaki et al. | 280/707 |
| 5,461,903 | 10/1995 | Harms | 340/605 |
| 5,577,812 | 11/1996 | Hirano et al. | 303/112 |

OTHER PUBLICATIONS

Toyota Soarer 1991 Model Service Manual, Toyota Motor Corporation, pp. 3-150 through 3-152, May 1991.

*Primary Examiner*—Jeffery A. Hofsass
*Assistant Examiner*—Daniel J. Wu
*Attorney, Agent, or Firm*—Burns, Doane, Swecker & Mathis, LLP

[57] ABSTRACT

The invention is directed to a pressure monitoring system for monitoring a hydraulic pressure which is supplied from a fluid pump and accumulated in an accumulator. The pressure monitoring system includes an electric motor which drives the fluid pump to supply the hydraulic pressure in substantially linear proportion to a current fed to the motor, a current detection device which detects the current fed to the motor, and a pressure estimation device which estimates the hydraulic pressure accumulated in the accumulator in response to the current detected by the current detection device. A malfunction detection device may be provided for detecting a malfunction on the basis of the output of the pressure estimation device.

4 Claims, 10 Drawing Sheets

PRESSURE MONITORING SYSTEM

BACKGROUND OF THE INVENTION

1. Field of the Invention

The present invention relates to a pressure monitoring system for monitoring a hydraulic pressure accumulated in an accumulator, and more particularly to the system for monitoring the hydraulic pressure which is supplied from a fluid pump and accumulated in the accumulator, for use in a vehicle anti-skid control system, for example.

2. Description of the Related Arts

In a prior anti-skid control system for an automotive vehicle, a pressure sensor and a pressure switch have been used for monitoring a hydraulic pressure which is supplied from a fluid pump and accumulated in an accumulator, as disclosed in a service manual of 1991 model of SOARER manufactured by Toyota Motor Corporation, pages 3–150 to 152, for example. This manual discloses output characteristics of the pressure sensor and pressure switch, and the operation of the motor or the like activated in response to output signals of the sensor and switch.

The pressure sensor includes a metallic diaphragm to which a hydraulic pressure is applied, and a semiconductor strain gauge which transforms the strain of the diaphragm into electric signals. The signals include a first switching signal for controlling a signal to actuate the motor, and a second switching signal for detecting an excessive pressure decrease. When the hydraulic pressure in the accumulator is decreased to be lower than a predetermined intermediate pressure, the pressure sensor provides the first switching signal as L (low) level to activate the motor. Whereas, when the pressure in the accumulator is increased to be higher than a predetermined high pressure, the pressure sensor provides the first switching signal as H (high) level to stop the operation of the motor. If the accumulator is decreased to be lower than a predetermined low pressure, i.e., the excessive low pressure, the pressure sensor provides the second switching signal as L (low) level to turn on a brake warning lamp, and to activate a buzzer. Thus, the first switching signal has a hysteresis as described above, so does the second switching signal.

On the contrary, the pressure switch includes a rubber diaphragm to which the hydraulic pressure is applied, and a micro-switch which is actuated by the diaphragm through a rod and a spring in response to displacement of the diaphragm. The pressure switch is provided for redundancy to the pressure sensor. That is, if a malfunction of the pressure sensor occurs, the pressure switch is used for controlling the operation of the motor. Therefore, it is so arranged that if the accumulator is decreased to be lower than a predetermined pressure approximately equal to the excessive low pressure, the pressure switch is activated to turn on the micro-switch to provide a H level signal, whereas the pressure switch is held to be off to keep the micro-switch off so as to provide a L level signal, when the hydraulic pressure in the accumulator is higher than a predetermined pressure which is set to be higher than the excessive low pressure by a certain range.

Comparing with the pressure switch, however, the pressure sensor is much higher in price, so that it causes cost-up in the anti-skid control system as a whole.

SUMMARY OF THE INVENTION

Accordingly, it is an object of the present invention to provide a pressure monitoring system for monitoring a hydraulic pressure supplied from a fluid pump and accumulated in an accumulator, at a low cost.

It is another object of the present invention to provide a low cost pressure monitoring system for monitoring a hydraulic pressure supplied from a fluid pump and accumulated in an accumulator thereby to detect a malfunction easily and certainly.

In accomplishing the above and other objects, a pressure monitoring system for monitoring a hydraulic pressure, which is supplied from a fluid pump and accumulated in an accumulator, includes an electric motor which drives the fluid pump to supply the hydraulic pressure in proportion to a current fed to the motor, a current detection device which detects the current fed to the motor, and a pressure estimation device which estimates the hydraulic pressure accumulated in the accumulator in response to the current detected by the current detection device.

In the above-described system, it is preferable that the pressure estimation device is adapted to estimate the hydraulic pressure accumulated in the accumulator in response to the current detected by the current detection device after a predetermined time elapsed from the time when the current was initially fed to the motor. The electric motor is preferably adapted to drive the fluid pump to supply the hydraulic pressure in substantially linear proportion to the current fed to the motor. The system may further comprise a malfunction detection device for detecting a malfunction on the basis of the output of the pressure estimation device.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENT

Figure 1:
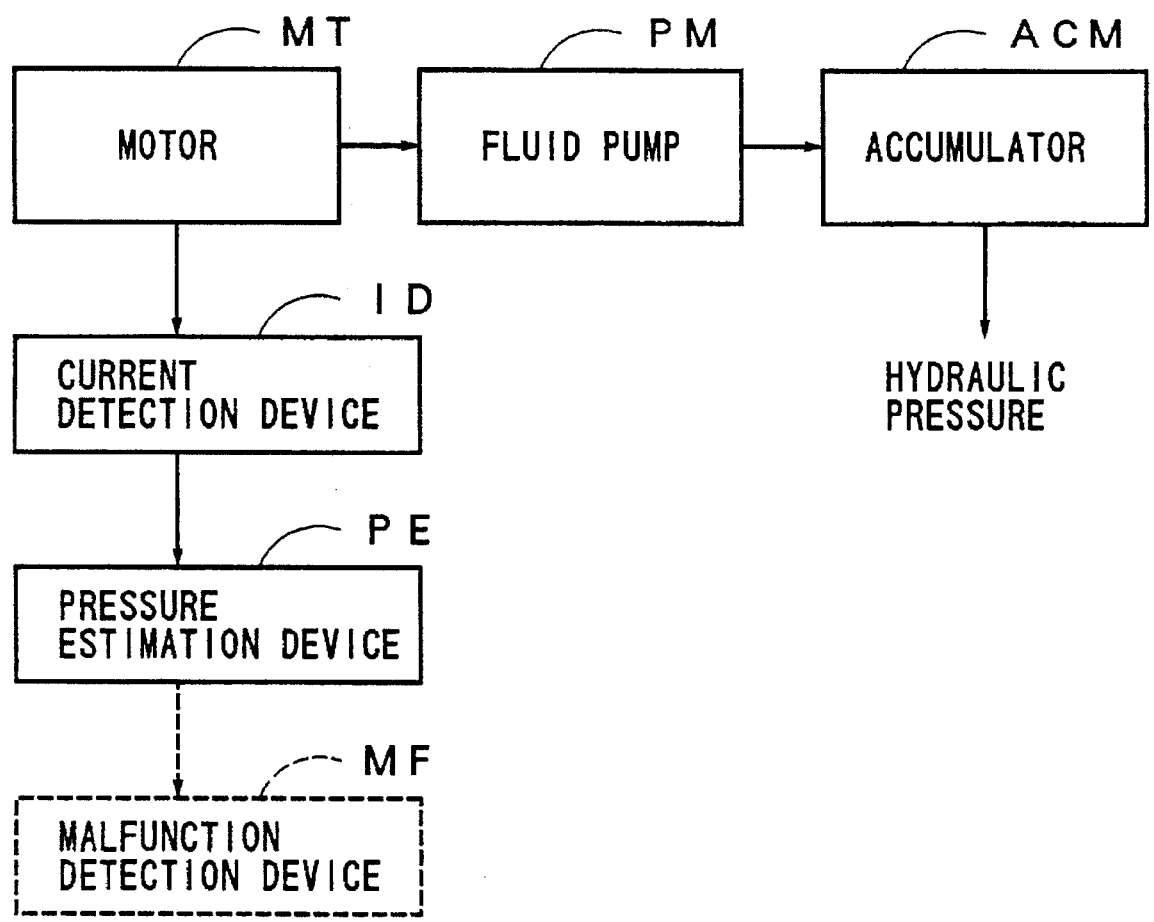
FIG. 1 is a general block diagram illustrating a pressure monitoring system according to the present invention.

Referring to FIG. 1, there is schematically illustrated a pressure monitoring system for monitoring a hydraulic pressure which is supplied from a fluid pump (PM) and accumulated in an accumulator (ACM), according to an embodiment of the present invention. The pressure monitoring system includes an electric motor (MT) which drives the fluid pump (PM) to supply the hydraulic pressure in substantially linear proportion to a current fed to the motor (MT), a current detection device (ID) which detects the current fed to the motor (MT), and a pressure estimation device (PE) which estimates the hydraulic pressure accumulated in the accumulator (ACM) in response to the current detected by the current detection device (ID). A malfunction detection device (MF) may be provided for detecting a malfunction on the basis of the output of the pressure estimation device (PE). The malfunction detection device (MF) may be adapted to determine that the malfunction occurs, when the pressure estimation device (PE) estimates the pressure accumulated in the accumulator (ACM) exceeds a predetermined pressure.

Figure 2:
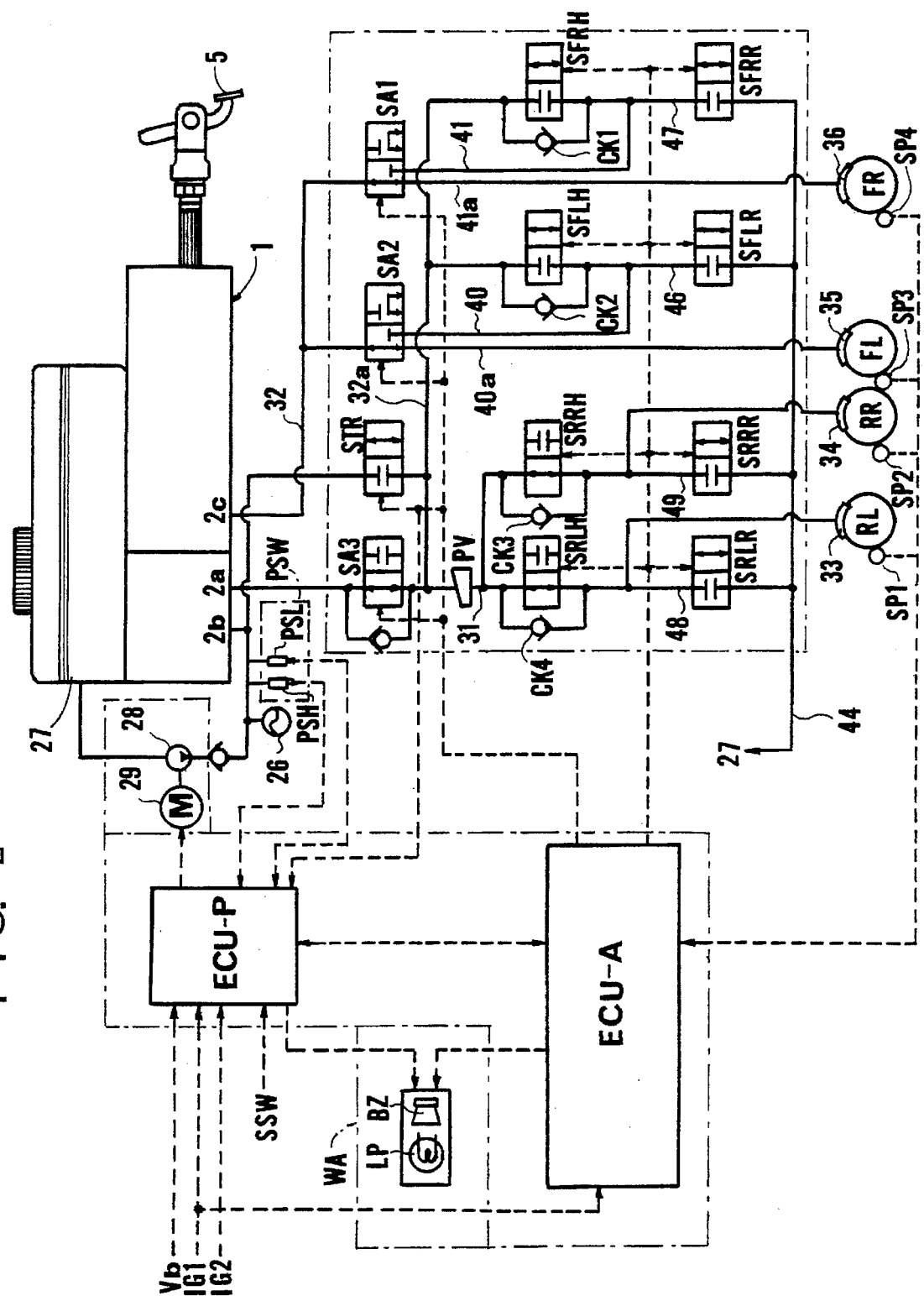
FIG. 2 is a schematic block diagram of a hydraulic braking pressure control system including a pressure monitoring system according to an embodiment of the present invention.
Figure 3:
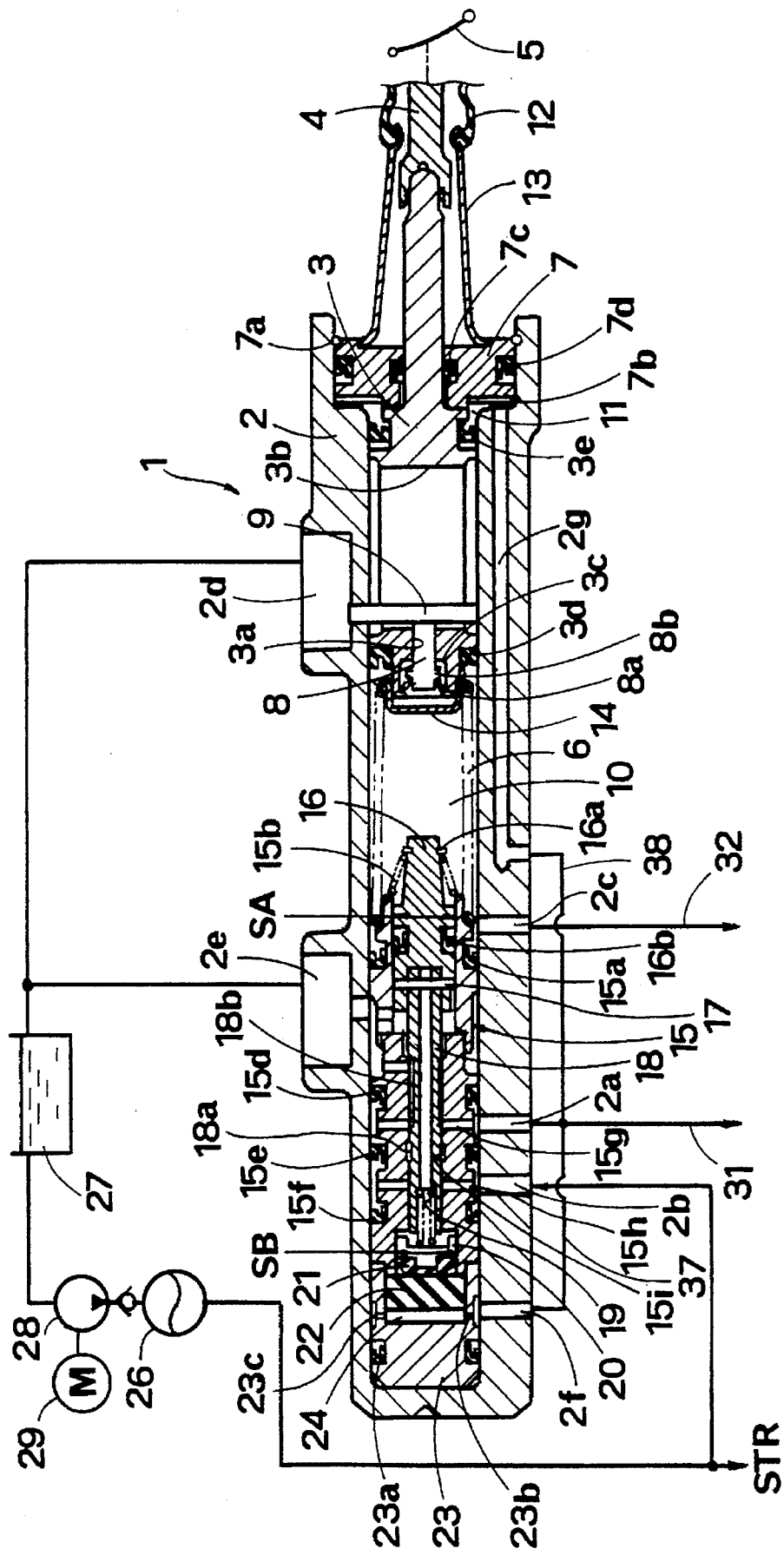
FIG. 3 is a sectional view of a pressure generating device used in the hydraulic braking pressure control system as shown in FIG. 2.

More specifically, the details of the embodiment disclosed in FIG. 1 are illustrated in FIGS. 2 to 5. Referring to FIG. 2, there is illustrated a hydraulic braking pressure control system having a pressure monitoring system and a hydraulic pressure generating device 1, which includes a cylinder body 2 and a first piston 3 slidably disposed in the cylinder body 2 as shown in FIG. 3, and a plurality of valves connected to the pressure generating device 1 through main passages 31, 32 as shown in FIG. 2. The first piston 3 is connected with a brake pedal 5 through a push rod 4. The first piston 3 is biassed by a return spring 6 so that the first piston 3 is in contact with a plate member 7 which is prevented from moving in the rightward direction by a snap ring 7a. A stopper 7b is disposed at the left side of the plate member 7 as shown in FIG. 3 for limiting leftward movement of the plate member 7.

The first piston 3 includes a connecting passage 3a into which an inlet valve 8 is inserted. The inlet valve 8 is biassed by a spring 8a, and is in contact with a pin 9 which is fixed to the cylinder body 2. The pin 9 is also inserted into a through hole 3b of the first piston 3. In the condition where the first piston 3 is not activated to be placed as shown in FIG. 3, a valve portion 8b of the inlet valve 8 is not in contact with a valve seat 3c provided on the first piston 3. Two seal cups 3d, 3e are mounted on the left and right portions respectively of the first piston 3. The plate member 7 includes an inner seal cup 7c and an outer seal cup 7d. With the above seal cups 3d, 3e, 7c and 7d, a pressure chamber 10 is formed at the left side of the first piston 3 and an auxiliary pressure chamber 11 is formed between the right side of the first piston 3 and the plate member 7. A boot 12 is provided to separate the inside of the pressure generating device 1 from the outside of the device 1. A retainer 13 is connected with the boot 12 to support the boot 12 and to prevent the push rod 4 from radially inclining. Further, a cup retainer 14 engages the first piston 3 so as to mount the return spring 6 on the first piston 3, and to prevent the seal cup 3d from being disengaged from the first piston 3.

A sleeve member 15 is forced by the return spring 6 so as to be in contact with a left end portion of the cylinder body 2. The sleeve member 15 includes a seal cup 15a which defines the other end of the pressure chamber 10. A second piston 16 is slidably disposed in the sleeve member 15. The second piston 16 is biassed in the rightward direction relative to the sleeve member 15 by a piston spring 15b so as to be in contact with a stopper 15c. The piston spring 15b is also engaged with a snap ring 16a disposed on the second piston 16. The second piston 16 includes a seal cup 16b for defining the pressure chamber 10 and for receiving the pressure in the pressure chamber 10 so as to be moved in the leftward direction in FIG. 3. The second piston 16 is connected with a spool valve 18 through a pin 17 so that the spool valve 18 is moved integrally with the second piston 16.

A piston return member 20 is connected with the left end of the spool valve 18 through a spring 19. A reaction member 21 which possesses a trapezoidal shaped configuration is mounted on the piston return member 20. The reaction member 21 is biassed by the spring 19 into contacting engagement with an elastic member 22 made of rubber or the like. In the illustrated embodiment, the short side of the trapezoidal configuration of the reaction member contacts the elastic member 22. A retainer 23 is fixed to the sleeve member 15 so as to prevent the sleeve member 15 from moving. The retainer 23 includes a seal cup 23a and passages 23b, 23c. The elastic member 22 forms a regulated pressure chamber 24 with the retainer 23.

The sleeve member 15 further includes seal cups 15d, 15e and 15f which are arranged in succession from the right to left. An outlet port 15g is disposed between the seal cups 15d, 15e for connection to a main passage 31 connecting to wheel cylinders 33, 34 operatively mounted on a rear left wheel (RL) and a rear right wheel (RR) of the vehicle. Further, an inlet port 15h is disposed between the seal cups 15e, 15f into which is introduced a brake fluid charged in an accumulator 26. The brake fluid is stored in a reservoir 27 and is pressurized by a fluid pump 28 so as to be charged into the accumulator 26. The outlet port 15g and the inlet port 15h are respectively connected with a regulator port 2a and an inlet port 2b formed in the cylinder body 2. The cylinder body 2 includes a port 2c connected to a main passage 32 connecting to wheel cylinders 35, 36 operatively mounted on a front left wheel (FL) and a front right wheel (FR). Further, the cylinder body 2 includes inlet ports 2d, 2e both of which are connected to the reservoir 27. The spool valve 18 includes a first groove 18a and a second groove 18b. The sleeve member 15 also includes a groove 15i. The regulator port 2a is connected to a port 2f which is connected to the regulated pressure chamber 24, through a passage 37. The regulator port 2a is further connected to the auxiliary pressure chamber 11 through a passage 2g and a feedback passage 38.

The operation of the pressure generating device 1 will be described hereinafter. When the brake pedal 5 is operated, the first piston 3 is moved in the leftward direction in FIG. 3 through the push rod 4. Therefore, the inlet valve 8 is separated from the pin 9, so that the valve portion 8b contacts the valve seat 3c by means of the biasing force of the spring 8a thereby to separate the pressure chamber 10 from the reservoir 27. Then, a hydraulic pressure (PM) is generated in the pressure chamber 10 with the stroke of the piston 3 increased to reduce the volume in the pressure chamber 10.

At this time, the second piston 16 receives a force (PM)×(SA)(SA: cross-sectional area of the second piston 16) thereby to be moved in the leftward direction in FIG. 3 since the second piston 16 receives the hydraulic pressure (PM) in the pressure chamber 10. The spool valve 18 is moved integrally with the second piston 16 in the leftward direction because the spool valve 18 is fixed to the second piston 16 by the pin 17. Therefore, the spool valve 18 compresses the spring 19 to be in contacting engagement with the piston return member 20. The first groove 18a of the spool valve 18 communicates with the inlet port 15h of the sleeve member 15 as a result of the movement of the spool valve 18, thereby to communicate the inlet port 15h with the groove 15i of the sleeve member 15 through the first groove 18a. On the other hand, the second groove 18b is communicated with the groove 15i to communicate the groove 15i with the outlet port 15g through the second groove 18b. Therefore, the inlet port 15h is communicated with the outlet port 15g by the leftward movement of the spool valve 18 in FIG. 3. Consequently, the hydraulic pressure in the accumulator 26 is introduced into the regulated pressure chamber 24 from the regulator port 2a through the port 2f because the inlet port 2b is communicated with the regulator port 2a through the inlet port 15h, the first groove 18a, the groove 15i, the second groove 18b and the outlet port 15g.

The pressure in the regulated pressure chamber 24 forces the elastic member 22 to move the spool valve 18 in the rightward direction through the reaction member 21 and the piston return member 20 against the hydraulic pressure (PM) in the pressure chamber 10. The spool valve 18 is balanced when the pressure forces which the spool valve 18 receives from the pressure chamber 10 and the regulated pressure chamber 24 are equal. In this case, when the area of the elastic member 22 in contact with the reaction member 21 is represented by (SV), a relation between the pressure (PM) in the pressure chamber 10 and a regulated pressure (PR) introduced into the regulated pressure chamber 24 from the accumulator 26 through the spool valve 18 is represented by (PM)×(SA)=(PR)×(SV), wherein the losses by the load of the return spring 6 or the like are omitted. Therefore, the regulated pressure (PR) introduced into the regulated pressure chamber 24 is represented by (PR)=(PM)×(SA)/(SV). When the regulated pressure (PR) in the regulated pressure chamber 24 is not very large, the area (SV) of the elastic member 22 in contact with the reaction member 21 is not very large, because the elastic member 22 is not strongly forced toward the reaction member 21. However, the area (SV) of the elastic member 22 becomes larger according to the increase of the regulated pressure (PR) until the area (SV) becomes a maximum value (SB). When the area of the reaction member 21 in contact with the elastic member 22 becomes the maximum value (SB), the regulated pressure (PR) is represented by (PR)=(PM)×(SA)/(SB). From that point on, the regulated pressure (PR) increases according to the increase of the hydraulic pressure (PM) in the pressure chamber 10 because the values (SA), (SB) are constant. Therefore, the characteristic of the relationship between the hydraulic pressure (PM) in the pressure chamber 10 and the regulated pressure (PR) in the regulated pressure chamber 24 can be altered or changed by changing the sectional area (SA) and the sectional area (SB) of the portion of the reaction member 21.

The regulated pressure (PR) introduced into the regulated pressure chamber 24 from the accumulator 26 through the spool valve 18 is transmitted to the auxiliary pressure chamber 11 through the passage 2g thereby to boost up the operation of the first piston 3, and is transmitted to the wheel cylinders 33, 34 mounted on the rear wheels (RR), (RL) through the changeover valve (SA3) and the control valves (SRLH), (SRRH). The hydraulic pressure (PM) in the pressure chamber 10 is supplied to the wheel cylinders 35, 36 mounted on the front wheels (FR), (FL), through the changeover valves (SA2), (SA1).

Referring back to FIG. 2, the hydraulic braking pressure control system will be explained hereinafter. The wheel cylinders 35, 36 are connected to the main passage 32 through pressure increasing passages 40a, 41a, respectively, in which changeover valves (SA2), (SA1) of 3-port 2-position solenoid valves are disposed respectively, so that the port 2c of the pressure generating device 1 is normally communicated with the wheel cylinders 35, 36. The changeover valves (SA2), (SA1) are connected to control passages 40, 41 respectively, which are connected to a control passage 32a through normally closed control valves (SFLH), (SFRH) of 2-port 2-position solenoid valves respectively. Therefore, when the valves (SA2), (SA1) are energized, the control passages 40, 41 are connected to the increasing passages 40a, 41a respectively, and are prevented from communicating with the port 2c of the pressure generating device 1. The control passages 40, 41 are also connected to relief passages 46, 47 respectively, in which normally closed control valves (SFLR), (SFRR) of 2-port 2-position solenoid valves are disposed, and which are connected to a reservoir 27 through a relief passage 44. In parallel with the valves (SFLH), (SFRH), check valves (CK2), (CK1) are disposed respectively, so as to allow the flow of the brake fluid from the wheel cylinders 35, 36 to the pressure generating device 1, and block the reverse flow from the pressure generating device 1 to the wheel cylinders 35, 36.

The regulator port 2a of the pressure generating device 1 is connected to the rear main passage 31, in which a normally opened changeover valve (SA3) of a 2-port 2-position solenoid valve is disposed, so that when the changeover valve (SA3) is energized, the main passage 31 is prevented from communicating with the port 2a. The wheel cylinders 33, 34 are connected to the main passage 31 through normally opened control valves (SRLH), (SRRH) of 2-port 2-position solenoid valves. A proportioning valve (PV) is disposed in the main passage 31 between the control valves (SRLH), (SRRH) and the changeover valve (SA3). The wheel cylinders 33, 34 are connected to relief passages 48, 49 respectively, in which normally closed control valves (SRLR), (SRRR) of 2-port 2-position solenoid valves are disposed, and which are connected to the reservoir 27 through the relief passage 44. In parallel with the control valves (SRLH), (SRRH), check valves (CK4), (CK3) are disposed, respectively, so as to allow the flow of the brake fluid from the wheel cylinders 33, 34 to the pressure generating device 1, and block the reverse flow from the pressure generating device 1 to the wheel cylinders 33, 34. The accumulator 26 is connected to the port 2b of the pressure generating device 1, and connected through a normally closed changeover valve (STR) of a 2-port 2-position solenoid valve to the control passage 32a and the main passage 31. Therefore, normally the hydraulic pressure in the accumulator 26 is not supplied to the passages 32a, 31. When the changeover valve (STR) is energized, the hydraulic pressure in the accumulator 26 is supplied to the passages 32a, 31. In order to detect wheel speeds of the wheels (RL), (RR), (FL) and (FR), wheel speed sensors (SP1) to (SP4) are disposed in the vicinity of those wheels, respectively.

According to the embodiment as shown in FIG. 2, a control unit (ECU-P) for controlling a pressure source including the pump 29 and accumulator 26, and a control unit (ECU-A) for controlling the hydraulic pressure in the wheel cylinders 33–36 are provided to communicate with each other through a communication line, and connected to a warning device (WA) which includes a buzzer (BZ), a lamp (LP) or the like to be operated when a malfunction occurs in the units (ECU-A) and (ECU-P). In the present embodiment, the pressure generating device 1, the valve arrangement including the changeover valves, control valves and check valves, the accumulator 26, the pressure switches (PSH), (PSL), the fluid pump 28, the motor 29, and the control unit (ECU-P) are formed as one body, according to the present embodiment.

The valves for controlling the hydraulic pressure disclosed in FIG. 2 will operate as follows. In the case where the brake pedal 5 is depressed to apply the brake force to the wheels when the vehicle is running on a road of a low coefficient of friction, such as a snow road or an icy road, and a locking of a front wheel is detected by the control unit (ECU-A) on the basis of the wheel speeds detected by the wheel speed sensors (SP1) to (SP4), then the changeover valves (SA2), (SA1) are activated to be placed in their second positions. As a result, the communication between the wheel cylinders 35, 36 and the port 2c which is connected to the pressure chamber 10, is blocked, and in turn the wheel cylinders 35, 36 can be communicated with the regulator port 2a of the pressure generating device 1, so that the regulated pressure (PR) regulated by the spool valve 18 can be introduced into the wheel cylinders 35, 36 in stead of the pressure (PM) in the pressure chamber 10.

If the locking of the front left wheel (FL) is detected, for example, the changeover valve (SA2) is activated to be placed in its second position, so that the wheel cylinder 35 is shut off from the pressure chamber 10. Also, the control valve (SFLR) is activated to be placed in its open position, without the control valve (SFLH) activated, so that the wheel cylinder 35 is communicated with the reservoir 27 through the relief passages 46, 44. Therefore, the brake fluid in the wheel cylinder 35 is drained to the reservoir 27 thereby to reduce the pressure in the wheel cylinder 35. Thus, the ABS operation is performed. When the control control unit (ECU-A) detects that the pressure in the wheel cylinder 35 has been reduced to release the wheel from locking, the control valve (SFLH) is activated, without the control valve (SFLR) activated, so that the regulated pressure (PR) is supplied from the pressure generating device 1 to the wheel cylinder 35 through the changeover valve (SA2) and the control valve (SFLH).

If the locking of the front right wheel (FR) is detected by the control control unit (ECU-A), the changeover valve (SA1) and the control valve (SFRR) are activated, without the control valve (SFRH) activated, thereby to reduce the pressure in the wheel cylinder 36. Also, if the locking of the rear wheels (RR), (RL) are detected by the control unit (ECU-A), the control valves (SRLH), (SRRH) and the control valves (SRLR), (SRRR) are activated to control the pressures in the wheel cylinders 33, 34. When the brake pedal 5 is released by the vehicle diver in the anti-skid operation, the check valves (CK2), (CK1), and the check valves (CK4), (CK3) are opened to return the brake fluid from the wheel cylinders 33, 34, 35 and 36 to the pressure generating device 1 immediately.

Figure 4:
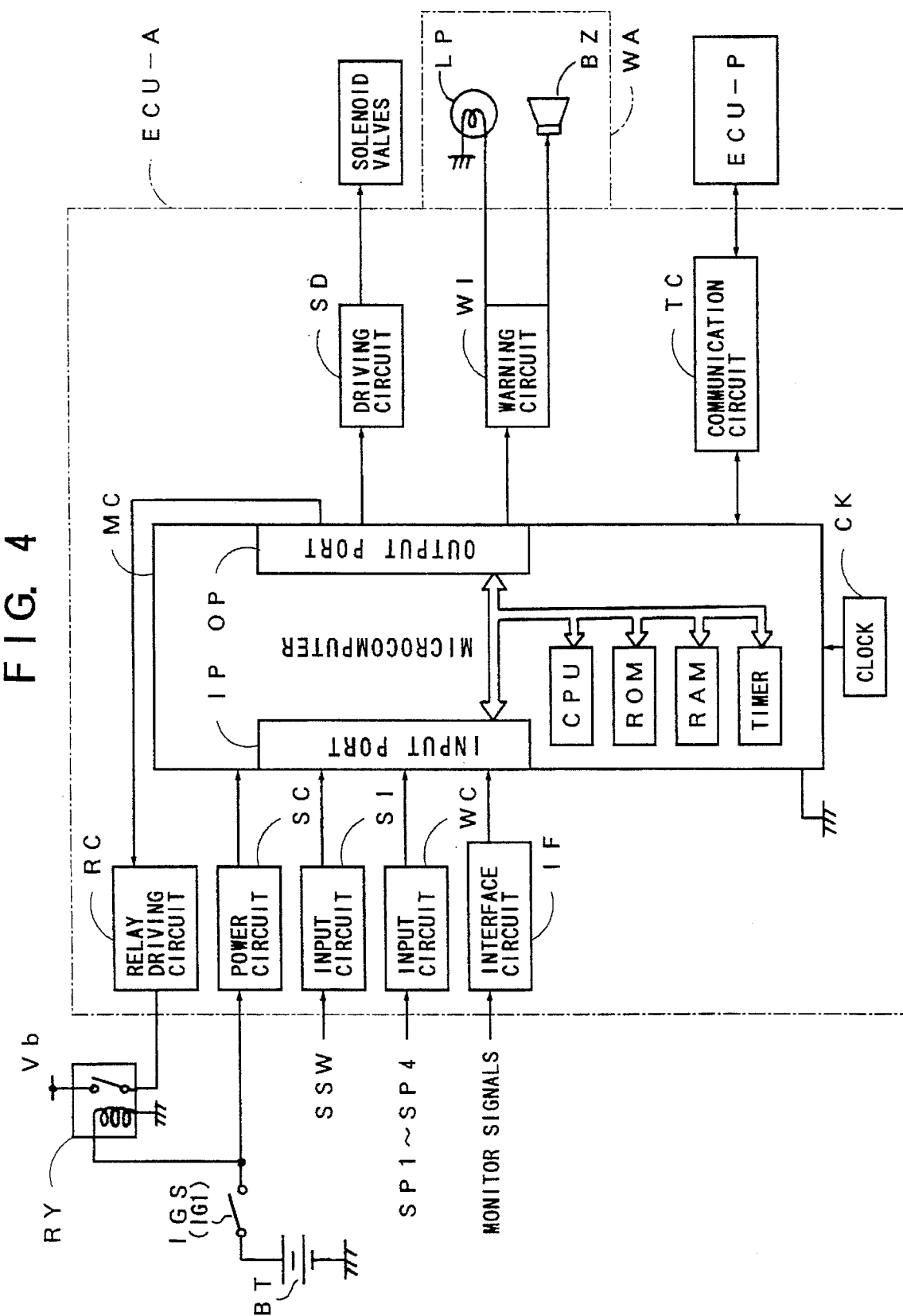
FIG. 4 is a block diagram illustrating the arrangement of a control unit for controlling a hydraulic pressure according to the above embodiment of the present invention.

Next, referring to FIG. 4, the control unit (ECU-A) for controlling the hydraulic pressure in the wheel cylinder will be explained. The control unit (ECU-A) has a microcomputer (MC), and various circuits connected thereto including a power source circuit (SC) which is connected to a vehicle battery (BT) through an ignition switch (IGS) so as to supply a power to the microcomputer (MC). The control unit (ECU-A) includes a clock unit (CK) which is connected to the microcomputer (MC) for supplying a clock signal thereto, so as to produce a cycle pulse. The microcomputer (MC) includes a central processing unit or CPU, read on memory or ROM, random access memory or RAM, timer, input port (IP) and output port (OP). The ROM stores therein a program for controlling the hydraulic pressure, the CPU executes the program stored in the ROM when the ignition switch (IGS) is turned on, and the RAM stores variable data for executing the program. The wheel speed sensors (SP1) to (SP4) are connected to the input port (IP) through an input circuit (WC) for supplying thereto wheel speed signals. A stop switch (SSW) is connected to the input port (IP) through an input circuit (SI) for supplying thereto a stop switch signal which indicates that the braking operation has been made by the vehicle driver. Also, various monitoring signals such as signals for monitoring the operation of the solenoid valves, a signal for monitoring the operation of a relay, and etc. are adapted to be input to the input port (IP) through an interface circuit (IF).

The output port (OP) of the microcomputer (MC) is connected through a relay driving circuit (RC) to a relay (RY) for supplying a power to each solenoid valve. Each solenoid valve is connected to the output port (OP) through a solenoid driving circuit (SD) so as to be actuated in accordance with the output signal from the output port (OP). Also, a warning circuit (WI) is connected to the output port (OP) so as to provide warning signals for the lamp (LP) and/or the buzzer (BZ) of the warning device (WA), when the microcomputer (MC) determines that a malfunction of the system occurs. The control unit (ECU-A) further includes a communication circuit (TC) which is connected to the control unit (ECU-P) for communicating with each other.

Figure 5:
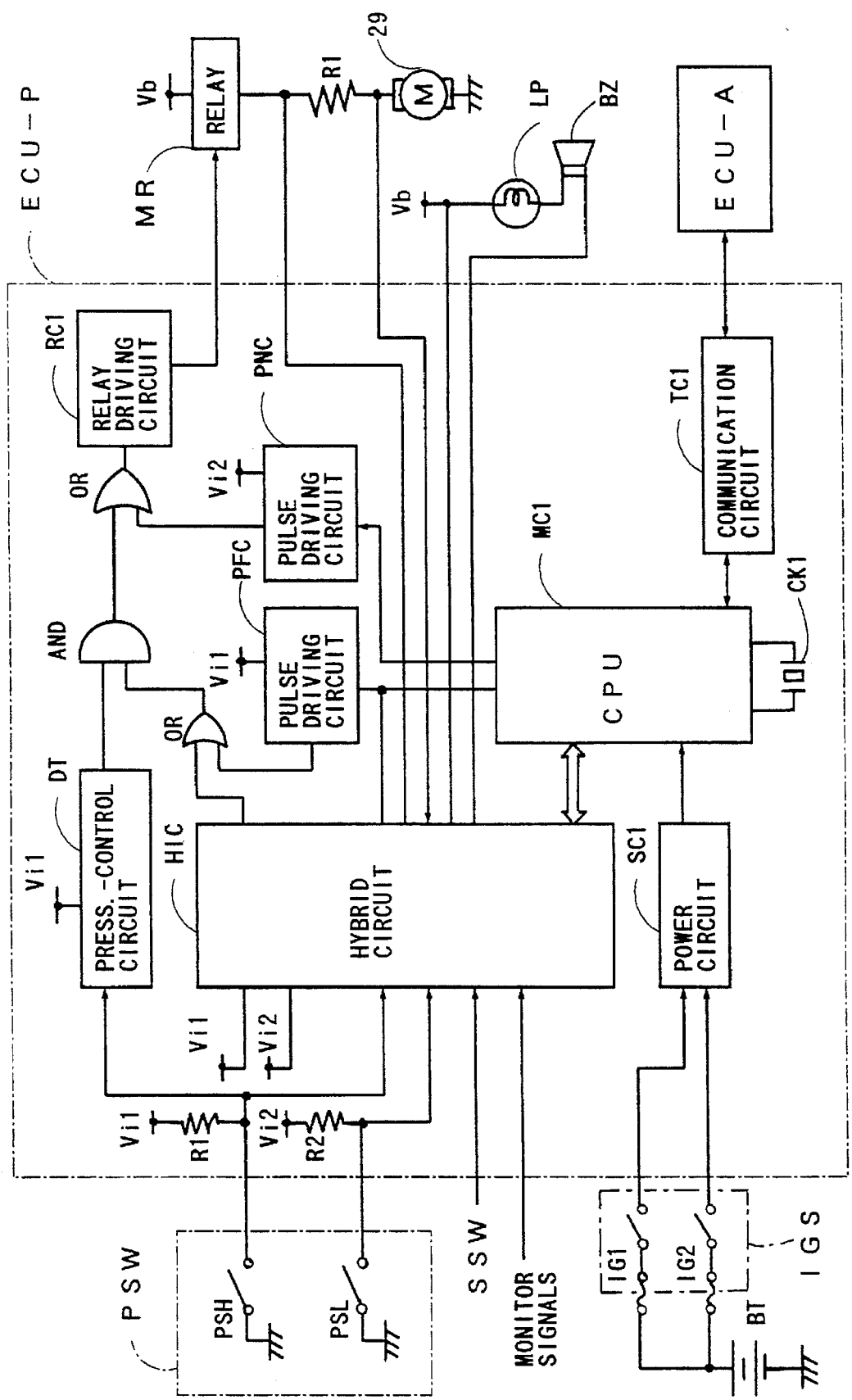
FIG. 5 is a block diagram illustrating the arrangement of a control unit for controlling a power source according to the above embodiment of the present invention.
Figure 9:
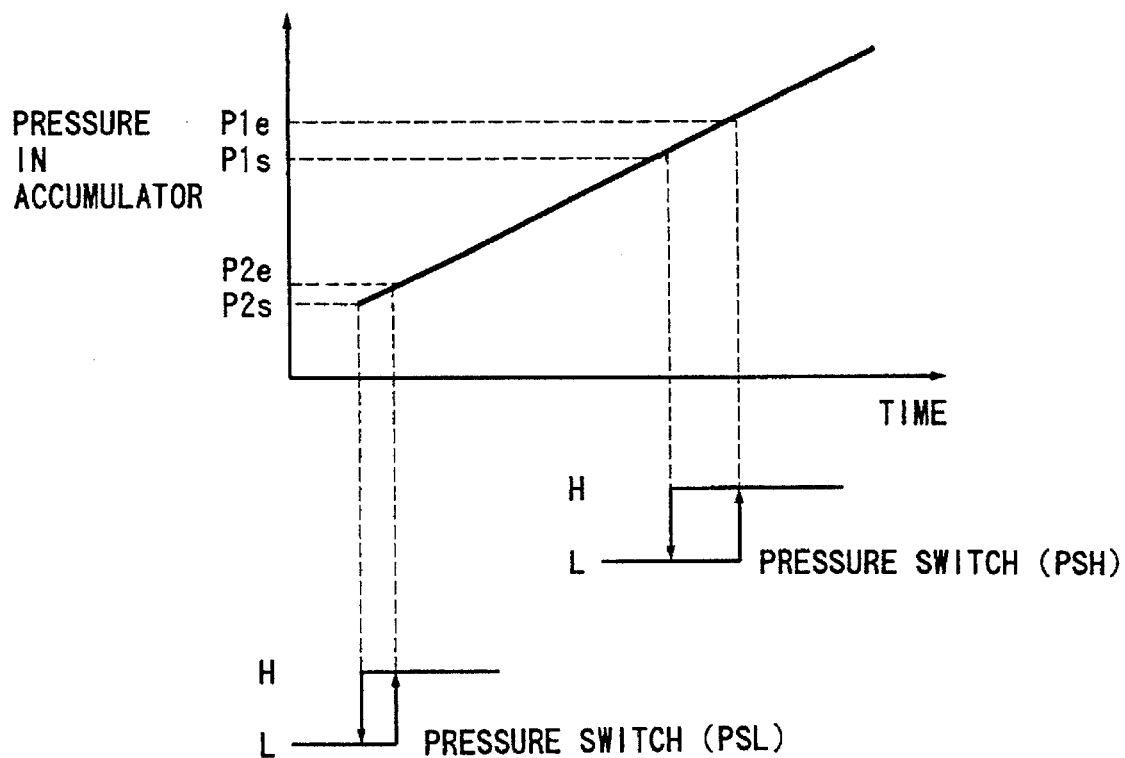
FIG. 9 is a graph showing transitional characteristics of switching signals output from the pressure monitoring system according to the above embodiment of the present invention.

Referring to FIG. 5, the control unit (ECU-P) for controlling the power source will be explained in detail hereinafter. The control unit (ECU-P) includes a power source circuit (SC1) which is connected to the vehicle battery (BT) to supply a power to a microcomputer (MC1) including a CPU, through a pair of ignition switches (IG1) and (IG2) which are provided for redundancy, and further includes a clock unit (CK1) which is connected to the microcomputer (MC1) for supplying a clock signal thereto to produce a cycle pulse. In order to detect the hydraulic pressure in the accumulator 26, disposed is a pressure switch (PSW) which includes a first pressure switch (PSH) and a second pressure switch (PSL). The first pressure switch (PSH) provides the H (high) level signal when the hydraulic pressure in the accumulator 26 is increased to be higher than a predetermined pressure (P1e), while it provides the L (low) level signal when the hydraulic pressure is decreased to be lower than a predetermined pressure (P1s), as shown in FIG. 9. Likewise, the second pressure switch (PSL) provides the H (high) level signal when the hydraulic pressure in the accumulator 26 is increased to be higher than a predetermined pressure (P2e), while it provides the L (low) level signal when the hydraulic pressure is decreased to be lower than a predetermined pressure (P2s). Thus, a hysteresis has been provided in each switch so as to avoid a hunting which may be caused in the control of the motor 29 when it drives the fluid pump 28 to increase and decrease the hydraulic pressure in the accumulator 26.

The control unit (ECU-P) includes a hybrid circuit (HIC) into which the output signals from the pressure switches (PSH), (PSL), a monitoring signal of the changeover valve (STR) and the output signal of the stop switch (SSW) are fed. The hybrid circuit (HIC) includes an interface (not shown) for receiving the output signals from the pressure switches, a pulse detection section (not shown) for allowing a pressure control circuit (DT), which will be described later, to output a driving signal to a relay driving circuit (RC1), which will be described later. The hybrid circuit (HIC) further includes a motor current and voltage detection section (not shown) which detects the current supplied to the motor 29 and voltages applied thereto through resistors R1, R2 so as to monitor the operation of the motor 29, and includes a lamp and buzzer driving section (not shown) which activates the lamp (LP) and/or the buzzer (BZ) when a malfunction occurs. The hybrid circuit (HIC) is activated by a redundancy power source for producing voltages (Vi1) and (Vi2) which are provided through the ignition switches (IG1), (IG2), respectively, and communicated with the microcomputer (MC1) connected to the power circuit (SC1) for communicating the pressure switch signals, information on the malfunction, and so on.

The control unit (ECU-P) includes a pair of pulse driving circuits (PFC), (PNC), which are activated by the voltages (Vi1), (Vi2), respectively, to provide a redundancy system which ensures the operation of the relay (MR) even if one of the circuits for producing the voltages is failed. The pulse driving circuit (PFC) is provided for normally supplying a signal for allowing the relay (MR) to be activated, and supplying a signal for prohibiting the relay (MR) from being activated when it received from the microcomputer (MC1) a prohibiting signal. The pulse driving circuit (PNC) is provided for supplying a driving circuit (RC1) of the relay (MR) in response to the output signal from the second pressure switch (PSL). That is, when the switch (PSL) outputs the signal indicative of the pressure being decreased, the pulse driving circuit (PNC) outputs a signal for allowing the driving circuit (RC1) to activate the relay (MR), whereas when the switch (PSL) outputs the signal indicative of the pressure being increased, the pulse driving circuit (PNC) outputs a signal for prohibiting the driving circuit (RC1) from activating the relay (MR). The pulse driving circuit (PNC) outputs a signal for allowing the driving circuit (RC1) to activate the relay (MR) until a predetermined time will elapse after the first pressure switch (PSH) outputs the signal indicative of the pressure being increased from the pressure (P1$s$) to exceed the pressure (P1$e$).

The pressure control circuit (DT) is arranged to normally output a driving signal to the driving circuit (RC1) in response to the output signal from the first pressure switch (PSH). That is, it outputs a signal for allowing the the driving circuit (RC1) to activate the relay (MR) when the output signal of the pressure switch (PSH) is smaller than the pressure (P1$s$), while the pressure control circuit (DT) outputs a signal for prohibiting the the driving circuit (RC1) from activating the relay (MR) when the output signal of the pressure switch (PSH) exceeds the pressure (P1$e$), and it prevents a chattering in the switching operation. The microcomputer (MC1) is adapted to communicate with control unit (ECU-A) through a communication circuit (TC1).

Figure 6:
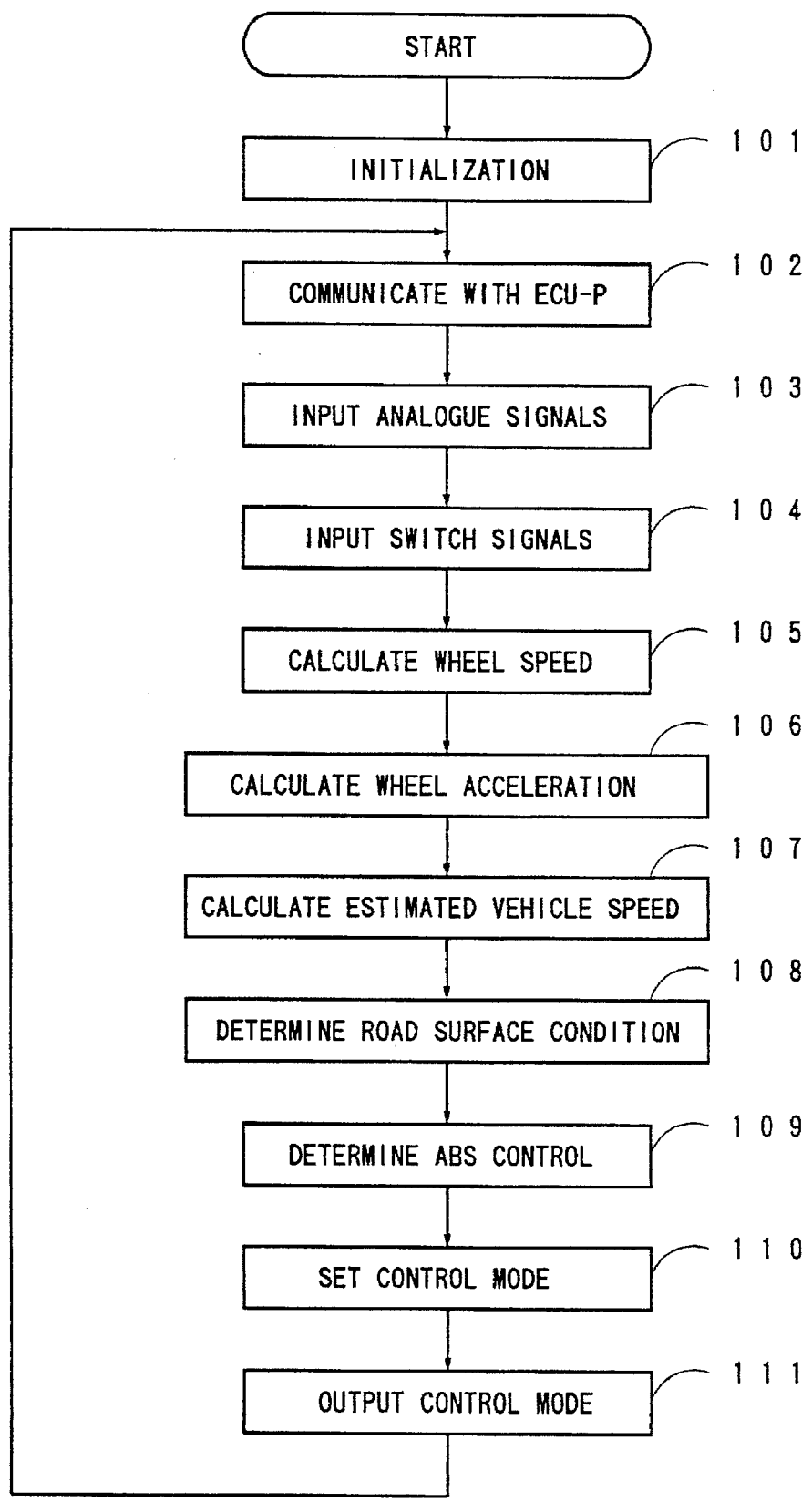
FIG. 6 is a flowchart showing the operation of the hydraulic pressure control unit according to the above embodiment of the present invention.

In the embodiment of the present invention as constituted above, the program routine, which is stored in the memory (ROM) of the control unit (ECU-A) corresponding to a flowchart as shown in FIG. 6, starts when the ignition switch (IGS) is turned on, and the electric power is supplied to the microcomputer (MC). At step 101, an initialization of the system is executed to check the memories (ROM) and (RAM), then clear various data in the memory (RAM), and set predetermined initial data in the memory (RAM). Also, an initial check is executed to energize the solenoid valves (SFRH), (SFRR), (SFLH) - - - (SRLR), (SA1), (SA2), (SA3) and (STR) in sequence every predetermined time (10 milliseconds), and to detect the signals for actuating the solenoid valves, thereby to determine whether each solenoid valve properly operates on the basis of the detected signals.

Then, at Step 102, the control unit (ECU-A) is communicated with the control unit (ECU-P). When a malfunction occurs in the system, a communication malfunction signal, an ECU malfunction signal, and etc., are transmitted from the control unit (ECU-A) to the control unit (ECU-P), and vice versa. An interval of the communication is determined by the control unit (ECU-A), so that the control unit (ECU-P) is adapted to return its acknowledge signal to the control unit (ECU-A). Then, the program proceeds to Step 103, where analogue signals fed from the various sensors are input to the control unit (ECU-A) so as to convert them into digital signals, and to Step 104 where a signal output from the stop switch (SSW) is input.

The program further proceeds to Step 105, where the wheel speed Vw is calculated in accordance with the output signal from each of the wheel speed sensors (SP1) to (SP4), and then the wheel acceleration (DVw) is calculated from the wheel speed (Vw) at Step 106. At Step 107, a calculation is made on the basis of the wheel speed (Vw) and the wheel acceleration (DVw) to provide an estimated vehicle speed (Vso). Then, at Step 108, a coefficient of friction of a road surface is estimated to provide one of a High-$\mu$, Mid-$\mu$ and Low-$\mu$. Then, the program proceeds to Step 109, where it is determined on the basis of various conditions whether the anti-skid control operation (abbreviated as ABS control) is to be allowed, and proceeds to Step 110 where a control mode is set. This control mode is selected from a pressure decrease mode, hold mode and pressure increase mode, in accordance with a slip rate of each wheel and vehicle deceleration, for example. The control mode is output at Step 111, and the program returns to Step 102, whereby the aforementioned Steps are repeated at a predetermined interval of 5 milliseconds for example.

Figure 7:
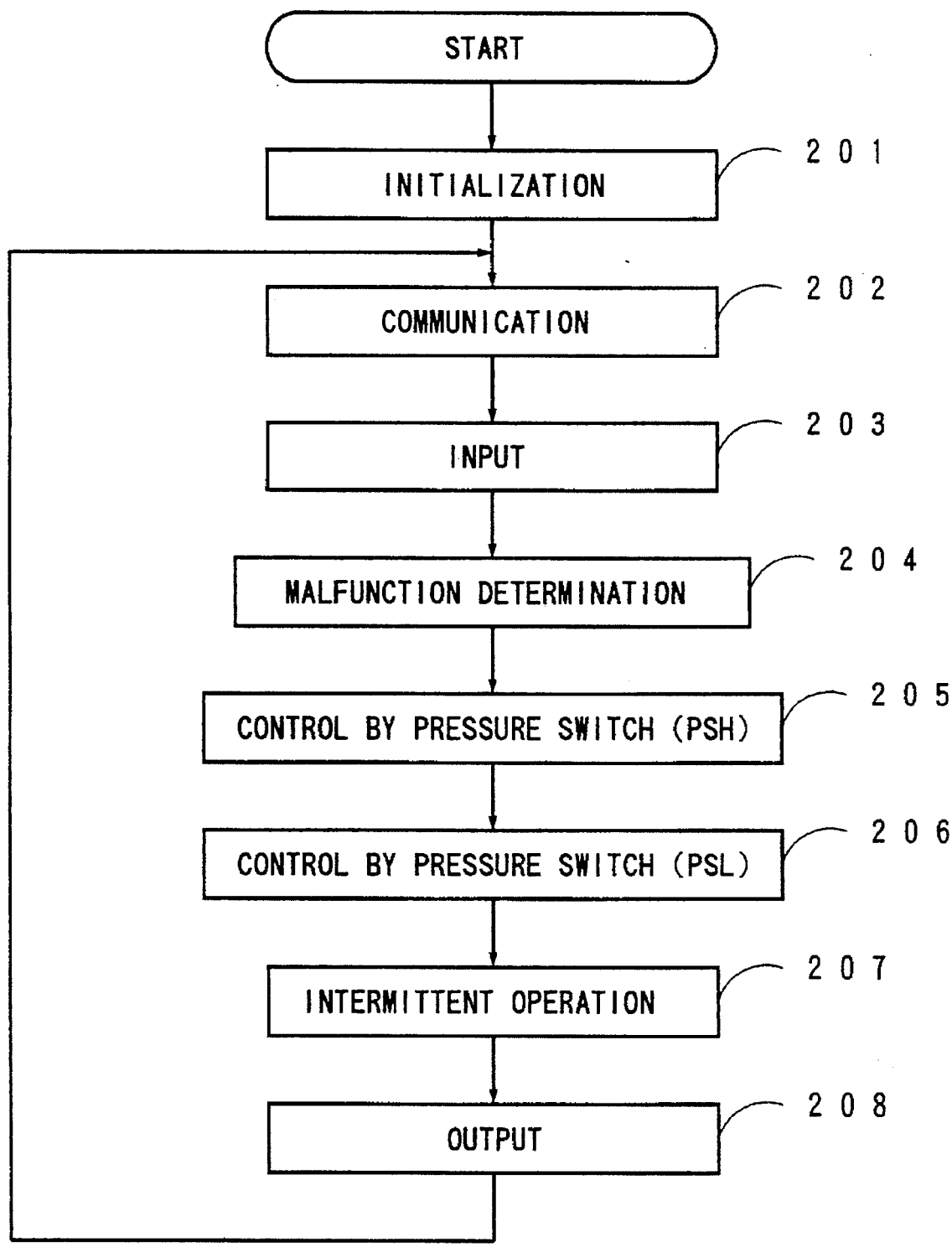
FIG. 7 is a flowchart showing the operation of the power source control unit according to the above embodiment of the present invention.

FIG. 7 illustrates a flowchart of a control executed in the control unit (ECU-P) for controlling the power source. At the outset, the initialization of the system is made at Step 201 so as to check the memories (ROM) and (RAM), then clear various data in the memory (RAM), and set predetermined initial data in the memory (RAM). Then, the program proceeds to Step 202, where the communication between the control unit (ECU-P) and the control unit (ECU-A) is made. The control unit (ECU-P) transmits its acknowledgement signal in response to a periodical signal fed from the control unit (ECU-A). If it is found that the period of the signal is longer or shorter than a predetermined period, it is determined that a malfunction in communication occurs. As a result, a signal indicative of the malfunction in communication is transmitted from the control unit (ECU-P) to the the control unit (ECU-A). Also, signals indicative of the malfunction in the the control unit (ECU-P), and that in the hydraulic pressure circuit, if any, are transmitted to the the control unit (ECU-A) as well, at Step 203.

Then, the program proceeds to Step 204 where the determination of the malfunction under the extreme low pressure is made by means of the pressure switch (PSW), and proceeds to Steps 205, 206 where the motor 29 is controlled in accordance with the output signals of the pressure switches (PSH), (PSL). That is, at Step 205, until a predetermined time elapses after the hydraulic pressure which is detected by the pressure switch (PSH) is increased from a pressure value smaller than the predetermined pressure (P1$s$) to a pressure value larger than the predetermined pressure (P1$e$), a flag for energizing the relay (MR) continues to be set. Thus, the pressure control is made basically in accordance with the output signal of the pressure switch (PSH).

When the hydraulic pressure is decreased to a large extent, however, the pressure control is made in accordance with the output signal of the pressure switch (PSL) at Step 206. If the output signal of the pressure switch (PSL) becomes smaller than the the predetermined pressure (P2s), a flag for operating the warning circuit (WI) is set.

Then, the program proceeds to Step 207 where an intermittent operation may be made. That is, in the case where the relay (MR) is energized for a relatively long time to activate the motor 29, the operation of the motor 29 is switched to the intermittent operation which energizes or de-energizes the relay (MR) alternately, thereby to prevent the motor 29 from being heated extremely high. When the braking operation is made, the relay (MR) is energized so as to provide a sufficient hydraulic pressure for braking. When the current fed to the motor 29 exceeds a predetermined value, the relay (MR) is de-energized to prevent a continuous relief of pressure from occurring after the pressure becomes high. Then, the signals for energizing the relay (MR) provided at Steps 205, 206 in accordance with the output signals of the pressure switches (PSH), (PSL), or the signals for actuating the warning lamp (LP) and/or buzzer (BZ) are output at Step 208, when some malfunctions occur, and thereafter the program returns to Step 202. The Steps 202–208 will be repeated every predetermined period, e.g., 10 milliseconds.

Figure 8:
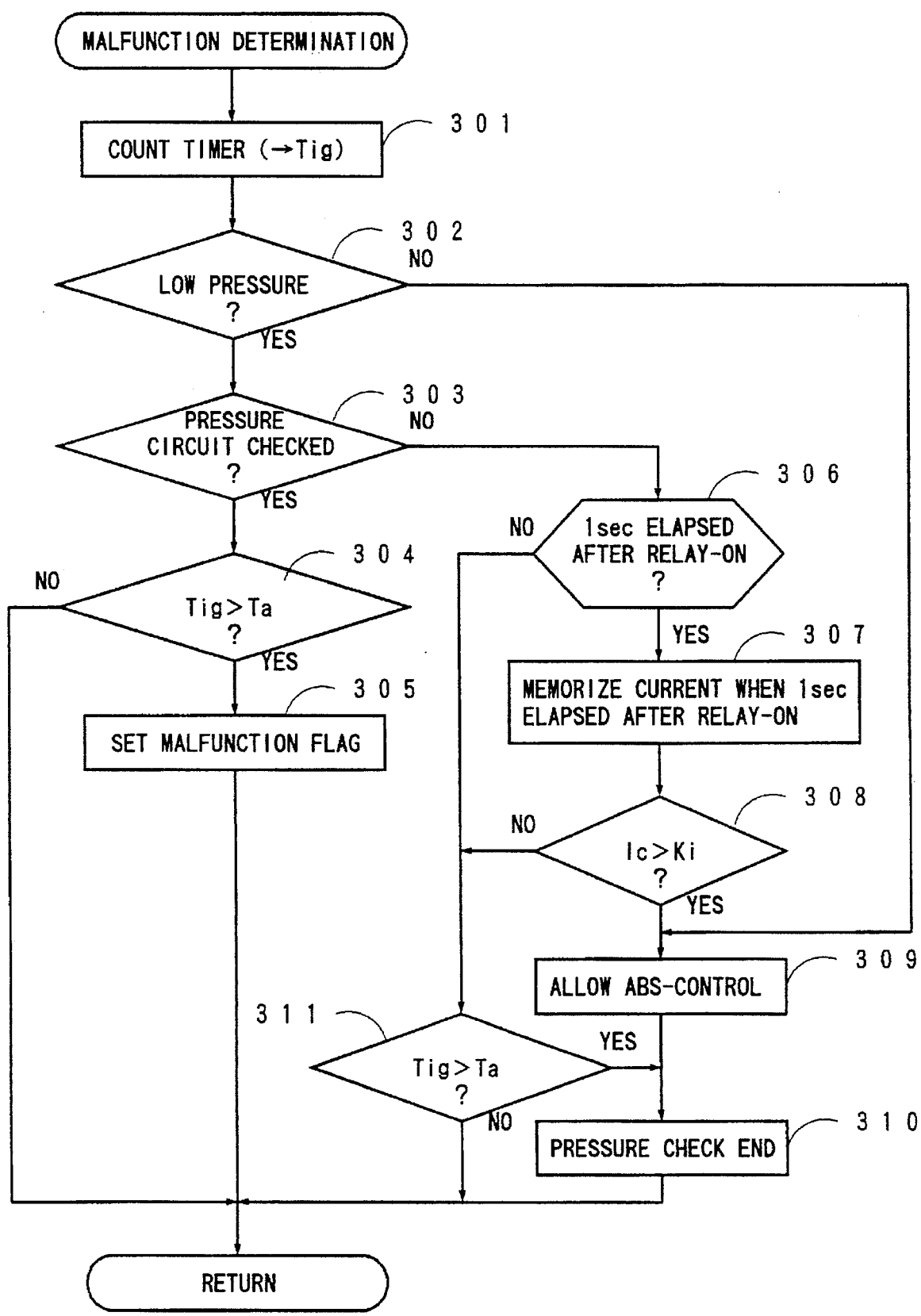
FIG. 8 is a flowchart showing the determination of a malfunction according to the above embodiment of the present invention.

The determination of the malfunction made at Step 204 in FIG. 7 will be explained hereinafter with reference to FIG. 8. When the program starts, a time (Tig) elapsed after the ignition switch (not shown) was turned on, is counted at Step 301. Then, it is determined at Step 302 whether the hydraulic pressure in the accumulator 26 is in the extreme low range, on the basis of the output signal of the pressure switch (PSL). If it is determined that the hydraulic pressure is in the extreme low range, the program proceeds to Step 303, otherwise it jumps to 309. At Step 303, it is determined whether the pressure circuits have been checked, and if the result is affirmative, the program proceeds to Step 304, while if the result is negative, it proceeds to Step 306. It is determined at Step 304 whether the time (Tig), which has elapsed after the ignition switch was turned on, exceeds a predetermined time (Ta), e.g., 50 seconds. If the time (Tig) has not exceeded the predetermined time (Ta), the program returns to the main routine. When the time (Tig) has exceeded the predetermined time (Ta), a flag indicative of the malfunction in the hydraulic pressure circuit is set.

Figure 10:
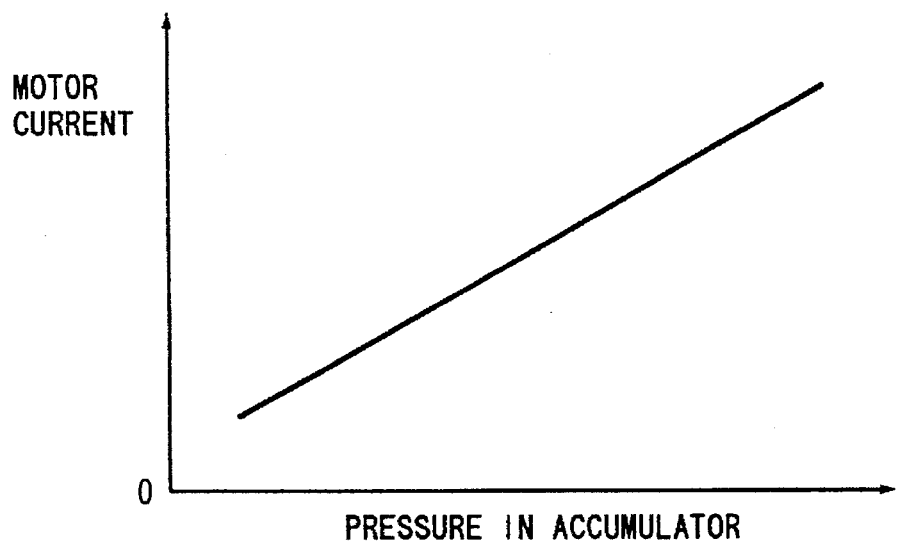
FIG. 10 is a graph showing a relationship between a pressure accumulated in an accumulator and a current fed to a motor according to the above embodiment of the present invention.

At Step 306, it is determined whether 1 (one) second has elapsed after the relay (MR) was energized to be "on". If the result is affirmative, the program proceeds to Step 307, otherwise it proceeds to Step 311. The current fed to the motor 29 when the predetermined time (e.g., 1 second) has elapsed after the relay (MR) was energized, is memorized in the memory (RAM) at Step 307. Next, at Step 308, it is determined whether a variation of the current (Ic), which is obtained by subtracting the current with 1 second elapsed as described above, from the present current, is greater than a predetermined value (Ki), e.g., 1.5 A. Since the current fed to the motor 29 increases in substantially linear proportion to the increase of the hydraulic pressure in the accumulator 26 as shown in FIG. 10, the hydraulic pressure in the accumulator 26 can be estimated by the current fed to the motor 29. Therefore, when the variation of the current is relatively large, it is determined that the current is increasingly fed to the motor to drive it properly in accordance with the elapse of time. Then, the program proceeds to Step 309 where a flag for allowing the anti-skid control (ABS control) is set. In the case where it has not elapsed 1 second after the relay (MR) was energized at Step 306, or the case where the variation of the current has not reached the predetermined value (Ki) at Step 308, it is determined at Step 311 whether the time (Tig), which has elapsed after the ignition switch was turned on, has also exceeded the predetermined time (Ta), e.g., 50 seconds. If the time (Tig) has exceeded the time (Ta), a flag for completion of the hydraulic pressure system check is set, thereby to finish the check. If the time (Tig) has not exceeded the predetermined time (Ta), the program returns to the main routine.

As described above, if any variation of the current fed to the motor does not occur under a relatively low pressure condition, even after the predetermined time has elapsed after the ignition switch was turned on, it is determined to be a malfunction of the pressure circuit. Specifically, when the relay (MR) is energized, the current fed to the motor 29 is transitionally increased at the outset. According to the present embodiment, therefore, it is so arranged that the determination of malfunction in the hydraulic pressure circuit is made on the basis of the variation of the current which is fed to the motor 29 and which has become stable after the predetermined time (1 second) elapsed from the time when the current initially fed to the motor 29, in such a manner that it is determined that a malfunction in the hydraulic pressure circuit is occurring, if the variation of the current is not increased, i.e., an increasing rate of the current fed to the motor is less than a predetermined rate. As examples of the malfunctions, there will be such a case that the pressure switch is fixed to indicate a low pressure, the malfunctions in motor terminals and power source lines, non-rotation of the motor, the malfunction in the hydraulic circuit, and etc.

Figure 11:
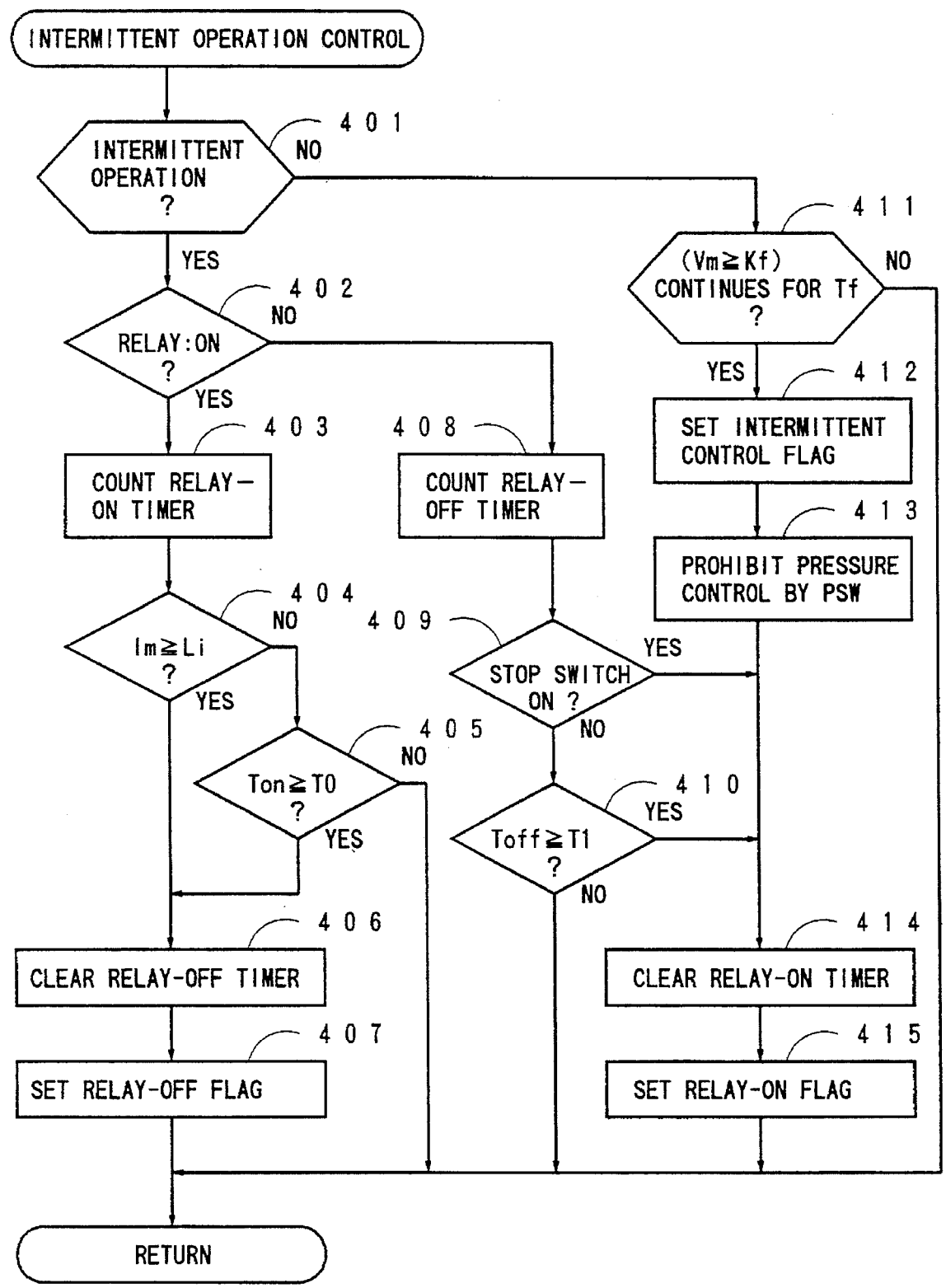
FIG. 11 is a flowchart showing an intermittent operation of a motor according to the above embodiment of the present invention.

Next will be explained with reference to FIG. 11 the intermittent operation of the motor, which is provided for preventing the motor 29 from rotating continuously to cause it to be heated. At Step 401, it is determined whether the intermittent operation is being made, or not. When the intermittent operation is being made, the program proceeds to Step 402, whereas if the intermittent operation has not started, the program proceeds to Step 411. At Step 402, it is determined whether the relay (MR) has been energized (i.e.,"on"). If the relay (MR) has been energized, the program proceeds to Step 403 where a duration for energizing the relay (MR), i.e., a time (Ton) is measured by counting a relay-on timer, then it is determined whether a detected current (Im) fed to the motor 29 is equal to or greater than a limit value (Li). If the result is affirmative, the program proceeds to Step 406 where a relay-off timer is cleared. If the detected current (Im) is smaller than the limit value (Li) the program proceeds to Step 405 where the time (Ton) is compared with a predetermined time (T0), e.g., 5 seconds. If the time (Ton) is determined to be equal to or greater than the predetermined time (T0), the program proceeds to Step 406 where the relay-off timer is cleared, and then proceeds to Step 407 where a relay-off flag is set to de-energize the relay (MR). If the time (Ton) is smaller than the predetermined time (T0), the program returns to the main routine.

As described before, the the current fed to the motor 29 increases in substantially linear proportion to the increase of the hydraulic pressure in the accumulator 26 as shown in FIG. 10, it is possible to estimate the current which is fed to the motor 29 when the hydraulic pressure in the accumulator 26 is increased to reach the relief pressure. Therefore, by setting the current which is fed to the motor 29 when the hydraulic pressure in the accumulator 26 is increased to reach the relief pressure, as the limit value (Li), it is possible to limit the hydraulic pressure in the accumulator 26 to be smaller than a predetermined pressure corresponding to the limit value (Li).

If it is determined at Step 402 that the relay (MR) has not been energized, the program proceeds to Step 408 where a duration for de-energizing the relay (MR), i.e., a time (Toff) is measured by counting the relay-off timer, then it is determined at Step 409 whether the stop switch (SSW) is turned on, or not. If the stop switch (SSW) is turned on, the program proceeds to Step 414 where the relay-on timer is cleared. If the stop switch (SSW) is not turned on, the program proceeds to Step 410 where it is determined whether the time (Toff) is compared with a predetermined time (T1), e.g., 5 seconds. If the time (Toff) is determined to be equal to or greater than the predetermined time (T1), the program proceeds to Step 414 where the relay-on timer is cleared, and then proceeds to Step 415 where the relay-on flag is set to energize the relay (MR). If the time (Toff) is smaller than the predetermined time (T1), the program returns to the main routine.

When it is determined at Step 401 that the intermittent operation is not being made, the program proceeds to Step 411, where it is determined whether such a condition that the voltage Vm of the motor 29 is equal to or greater than a predetermined voltage (Kf), e.g., 12 V, continues for a predetermined period of time (Tf), e.g., 5 minutes. If it is determined that the condition lasts for the period of time (Tf), the program proceeds to Step 412 where an intermittent control flag is set, otherwise the the program returns to the main routine. Next to the Step 412, the pressure control which is to be made in response to the output signal from the pressure switch (PSW) will be prohibited at Step 413. Then, the program further proceeds to Step 414 where the relay-on timer is cleared, and then proceeds to Step 415 where the relay-on flag is set to energize the relay (MR).

By controlling the current fed to the motor 29 so as not to exceed the predetermined limit value (Li), therefore, it is possible to limit the hydraulic pressure in the accumulator smaller than the upper limit, and even to eliminate the relief valve. Without using the prior pressure sensor which is expensive relative to the pressure switch, the above-described embodiment is equipped with only a relatively inexpensive pressure switch thereby to be reduced in cost. Furthermore, both of the systems for detecting the hydraulic pressure in the accumulator, i.e., one for indirectly detecting the current fed to the motor, and the other one for directly detecting the pressure (by the pressure switch), are employed to provide a redundancy system according to the present embodiment. Therefore, if a malfunction of the pressure switch is caused to feed the current to the motor for a relatively long time, that malfunction may be notified to the vehicle driver by visible or audible signals, i.e., light or sound output from the lamp (LP) or buzzer (BZ).

It should be apparent to one skilled in the art that the above-described embodiments are merely illustrative of but a few of the many possible specific embodiments of the present invention. The arrangement of the changeover valves and control valves are not limited to that of the above-described embodiment. A single 3-port 2-position solenoid valve may be substituted for the 2-port 2-position solenoid valves. The control unit for controlling the hydraulic pressure and the control unit for controlling the pressure source may be formed as one body. The control unit for controlling the hydraulic pressure is not limited to the one used in the anti-skid control system as described above, but may be substituted by the one used in a traction control system (TRC) which prevents a slip of a vehicle when starting or accelerating, or the one used in a stability control system which prevents oversteering or understeering of a vehicle when a lateral acceleration or a yaw rate is relatively large. Numerous and various other arrangements can be readily devised by those skilled in the art without departing from the spirit and scope of the invention as defined in the following claims.

What is claimed is:

1. A pressure monitoring system for monitoring a hydraulic pressure which is supplied from a fluid pump and accumulated in an accumulator, comprising:

an electric motor for driving said fluid pump to supply the hydraulic pressure in proportion to a current fed to said motor;

current detection means for detecting the current fed to said motor; and pressure estimation means for estimating the hydraulic pressure accumulated in said accumulator in response to the current detected by said current detection means.

2. A pressure monitoring system as claimed in claim 1, wherein said pressure estimation means is adapted to estimate the hydraulic pressure accumulated in said accumulator in response to the current detected by said current detection means after a predetermined time elapsed from the time when the current was initially fed to said motor.

3. A pressure monitoring system as claimed in claim 1, wherein said electric motor is adapted to drive said fluid pump to supply the hydraulic pressure in substantially linear proportion to the current fed to said motor.

4. A pressure monitoring system as claimed in claim 1, further comprising malfunction detection means for detecting a malfunction on the basis of the output of said pressure estimation means.

* * * * *